(12) United States Patent
Ezrielev et al.

(10) Patent No.: US 12,339,949 B2
(45) Date of Patent: Jun. 24, 2025

(54) SYSTEM AND METHOD FOR SELECTING SECURITY QUESTIONS FOR DEVICE AUTHENTICATION BASED ON SECURITY SCORES OF DATA

(71) Applicant: Dell Products L.P., Round Rock, TX (US)

(72) Inventors: Ofir Ezrielev, Be'er Sheva (IL); Jehuda Shemer, Kfar Saba (IL); Ronen Rabani, Kibuts Telalim (IL)

(73) Assignee: Dell Products L.P., Round Rock, TX (US)

( * ) Notice: Subject to any disclaimer, the term of this patent is extended or adjusted under 35 U.S.C. 154(b) by 332 days.

(21) Appl. No.: 18/188,002

(22) Filed: Mar. 22, 2023

(65) Prior Publication Data

US 2024/0320319 A1    Sep. 26, 2024

(51) Int. Cl.
*G06F 21/45* (2013.01)
*G06F 21/31* (2013.01)
*H04L 9/40* (2022.01)

(52) U.S. Cl.
CPC ............ *G06F 21/45* (2013.01); *G06F 21/316* (2013.01); *H04L 63/08* (2013.01)

(58) Field of Classification Search
CPC ......... H04L 63/08; G06F 21/316; G06F 21/45
See application file for complete search history.

(56) References Cited

U.S. PATENT DOCUMENTS

2017/0230410 A1   8/2017   Hassanzadeh
2020/0244681 A1   7/2020   Klawe et al.
2021/0342347 A1   11/2021  de Abreu Pinho
2024/0054245 A1*  2/2024   Van Dyne ........... G06F 16/2457
2024/0154982 A1   5/2024   Maha

OTHER PUBLICATIONS

"Zero Trust—Revolutionary approach to Cyber or just another buzz word?" Deloitte LLP, 2021 (16 Pages).
Awati, Rahul, et al., "certificate revocation list (CRL)" TechTarget, Web Page <https://www.techtarget.com/searchsecurity/definition/Certificate-Revocation-List> accessed on Nov. 22, 2022 (9 Pages).

* cited by examiner

*Primary Examiner* — Benjamin A Kaplan
(74) *Attorney, Agent, or Firm* — WOMBLE BOND DICKINSON (US) LLP

(57) ABSTRACT

Methods and systems for authenticating data processing systems throughout a distributed environment without user intervention are disclosed. To authenticate data processing systems without user intervention, a system may include a network core and one or more data processing systems. The network core may attempt to authenticate data processing systems using a security questionnaire. Security questions in the security questionnaire may be based on telemetry data obtained from the data processing system prior to a loss of a root of trust. To conserve computing resources, only telemetry data with a security score that exceeds a security score threshold may be retained. The network core may provide the data processing system with a security questionnaire and the data processing system may use similar telemetry data to respond to the security questionnaire. If the answers to the security questions are considered accurate, the data processing system may be re-authenticated.

20 Claims, 10 Drawing Sheets

Telemetry Data 400

| Data Point | Data Security Score | Global Security Score |
|---|---|---|
| 45 °C | 2 | 5 |
| 30 °C | 1 | 2 |
| 21 °C | 2 | 3 |
| 22 °C | 3 | 2 |

Activity Log 402

| Data Point | Data Security Score | Global Security Score |
|---|---|---|
| 32 °C | 3 | 2 |
| 25 °C | 3 | 1 |
| 24 °C | 4 | 2 |
| 35 °C | 5 | 4 |

Security Score Threshold 404: 22

Security Profile 406: 22

FIG. 4A

Telemetry Data 400

| Data Point | Data Security Score | Global Security Score |
|---|---|---|
| 30 °C | 1 | 2 |
| 21 °C | 2 | 3 |
| 22 °C | 3 | 2 |

Updated Activity Log 408

| Data Point | Data Security Score | Global Security Score |
|---|---|---|
| 45 °C | 2 | 5 |
| 25 °C | 3 | 1 |
| 24 °C | 4 | 2 |
| 35 °C | 5 | 4 |

Security Score Threshold 404: 22

Updated Security Profile 410: 26

FIG. 4B

Security Questionnaire 420

1. What temperature was recorded at timestamp 2022-03-20 03:02:08?

2. What was the highest temperature recorded last week?

3. What was the average temperature recorded on 2022-05-06?

Accepted Answers 422

1. 35 °C
2. 24 °C
3. 25 °C

Status 424:
Authentic

FIG. 4C

SYSTEM AND METHOD FOR SELECTING SECURITY QUESTIONS FOR DEVICE AUTHENTICATION BASED ON SECURITY SCORES OF DATA

FIELD

Embodiments disclosed herein relate generally to device authentication. More particularly, embodiments disclosed herein relate to systems and methods to reduce computing resource expenditure while performing device authentication throughout a distributed environment.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 4A-4C show block diagrams illustrating a system in accordance with an embodiment over time.

DETAILED DESCRIPTION

Figure 1:
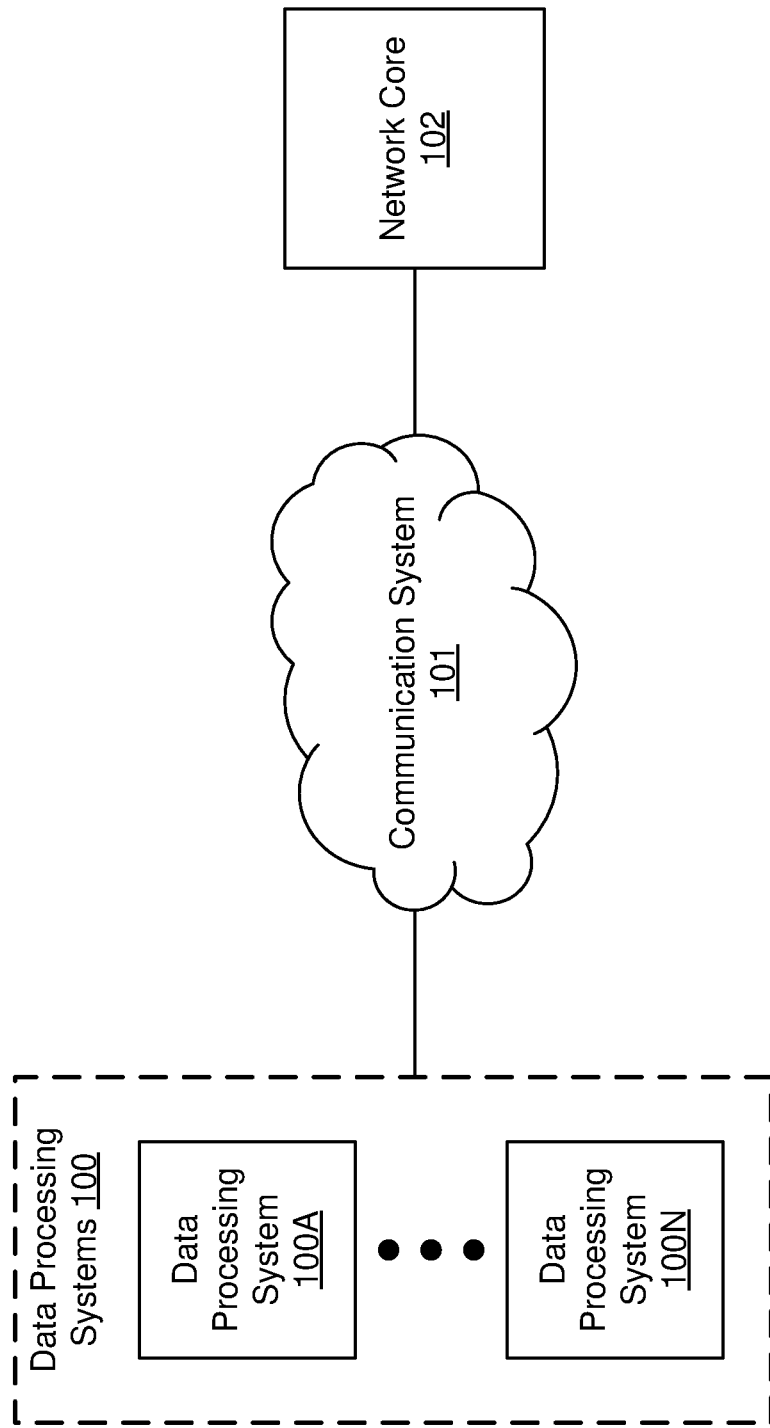
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for authentication of data processing systems throughout a distributed environment without user intervention. To authenticate data processing systems throughout a distributed environment without user intervention, the system may include a network core. The network core may initially establish a root of trust with a data processing system of the distributed environment via user intervention (by a user, for example, entering a password, pin, fingerprint scan, etc.). Once the root of trust is established, a secure communication channel may be opened between the network core and the data processing system.

However, the root of trust may become lost due to, for example, a duration of time passing, a password change, a cryptographic key change, etc. Re-establishing the root of trust with the data processing system (e.g., throughout an environment that may be highly distributed with a large number of data processing systems) may be a computationally expensive and time-consuming process. This process may require, for example, a user to re-enter a password, answer security questions, physically re-locate one or more data processing systems, and/or may require other means of user intervention.

To conserve computing resources and efficiently re-establish the root of trust with the data processing system, the system may utilize shared knowledge regarding historical telemetry data obtained from one or more data sources throughout the distributed environment. To do so, the system may collect and store telemetry data following establishment of a root of trust. Therefore, in the event of dissolution of the root of trust, the system may generate a security questionnaire based on the telemetry data.

However, the system may have a limited quantity of computing resources available to accommodate storage of the telemetry data. To reduce the computing resources required to store the telemetry data, only data points of the telemetry data that meet previously determined criteria may be stored. To determine whether a data point of the telemetry data meets the previously determined criteria, a security score associated with the data point may be obtained. Data points with security scores that exceed a security score threshold may be less vulnerable to duplication by unauthorized entities and, therefore, may be used to generate more secure security questions than data points with security scores that do not exceed the security score threshold. Consequently, data points with security scores that exceed the security score threshold may be stored (up to a storage capacity) in an activity log and used to generate security questions.

The system may provide the security questionnaire to the data processing system and may receive a response including answers to each security question in the security questionnaire. If the answers match (at least substantially) pre-determined answers to the security questions, the network core may recognize the data processing system as authentic. Once the data processing system is recognized as authentic, the root of trust may be re-established, and secure communications may resume.

Thus, embodiments disclosed herein may provide an improved system for authenticating data processing systems throughout a distributed environment. Devices may be re-authenticated following dissolution of a root of trust without intervention from a user and using pre-existing shared knowledge already stored by the data processing system for other purposes. To re-establish the root of trust, security questions may be generated based on the telemetry data stored in the activity log. Consequently, roots of trust may be efficiently re-established as needed throughout a distributed environment while conserving computing resources and without intervention by a user.

In an embodiment, a method of authenticating a data processing system by a network core throughout a distributed environment is provided. The method may include: obtaining telemetry data from the data processing system, the telemetry data being based on historic activities of the data processing system; identifying a listing of candidate data points from the telemetry data, the listing of the candidate data points comprising data points of the telemetry data with security scores that that exceed a security score threshold; attempting to improve a security profile of an activity log using the listing of the candidate data points to obtain an updated activity log; and performing a validation of the data processing system using a security questionnaire, the security questionnaire comprising security questions based on the updated activity log.

Identifying the listing of the candidate data points may include: for each data point of the telemetry data: obtaining a security score associated with the data point, the security score indicating a potential security impact of adding the data point to the activity log on the security profile of the activity log; making a first determination regarding whether the security score exceeds the security score threshold; and in an instance of the first determination in which the security score exceeds the security score threshold: adding the data point to the listing of the candidate data points.

Obtaining the security score associated with the data point may include: performing a security score optimization process, wherein performing the security score optimization process comprises: obtaining one or more potential security questions based on the data point; obtaining a listing of potential security scores, each potential security score of the listing of the potential security scores corresponding to a potential security question of the one or more potential security questions; identifying one or more potential security scores that indicate a highest degree of security based on the listing of the potential security scores; and assigning the security score based on the one or more potential security scores that indicate the highest degree of security.

Obtaining the security score associated with the data point may include: obtaining an inference model trained to generate the security score based on: a global security score associated with a security risk level of a source of the data point; and a data security score associated with characteristics of the data point; and obtaining an inference using the trained inference model, the inference comprising the security score.

The security risk level of the source of the data point may be based on a level of difficulty of duplicating a measurement of a quantity measured by the source of the data point.

Attempting to improve the security profile of the activity log may include: obtaining an available storage capacity of the activity log; making a second determination regarding whether a storage requirement of the listing of the candidate data points exceeds the available storage capacity of the activity log; and in a first instance of the second determination in which the storage requirement does not exceed the available storage capacity: adding the listing of the candidate data points to the activity log to obtain the updated activity log.

Attempting to improve the security profile of the activity log may also include: in a second instance of the second determination in which the storage requirement exceeds the available storage capacity: making a third determination, using the listing of the candidate data points and the activity log, regarding whether replacing a data point of the activity log with a candidate data point of the listing of the candidate data points improves the security profile; in a first instance of the third determination in which replacing the data point with the candidate data point improves the security profile: replacing the data point with the candidate data point to obtain the updated activity log; and in a second instance of the third determination in which replacing the data point with the candidate data point does not improve the security profile: treating the activity log as the updated activity log.

The method may also include: after attempting to improve the security profile of the activity log: obtaining an updated security score for a data point stored in the updated activity log; making a first determination regarding whether the updated security score exceeds the security score threshold; in a first instance of the first determination in which the updated security score exceeds the security profile threshold: maintaining the data point in the updated activity log; and in a second instance of the first determination in which the updated security score does not exceed the security profile threshold: removing the data point from the updated activity log; and updating the available storage capacity of the updated activity log.

Performing the validation of the data processing system may include: identifying an occurrence of an event indicating that the data processing system is to be authenticated; obtaining a security questionnaire, based on the occurrence of the event, using the updated activity log; providing the security questionnaire to the data processing system; obtaining a response from the data processing system, the response comprising answers to the security questions in the security questionnaire; making a first determination regarding whether each answer of the answers matches a pre-determined answer from a set of possible answers; and in an instance of the first determination in which each answer of the answers matches the pre-determined answer: concluding that the data processing system is authentic.

The activity log may include telemetry data known to the data processing system and the network core, the telemetry data being obtained prior to a loss of a root of trust between the data processing system and the network core.

The validation of the data processing system may be performed without user intervention and concluding that the data processing system is authentic may re-establish the root of trust.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include any type and quantity of computer-implemented services. For example, the computer-implemented services may include monitoring services (e.g., of locations), communication services, and/or any other type of computer-implemented services.

To provide the computer-implemented services, the system may include network core 102. Network core 102 may provide all, or a portion of, the computer-implemented services. For example, network core 102 may provide computer-implemented services to users of network core 102 and/or other computing devices operably connected to network core 102. The computer-implemented services may include any type and quantity of services including, for example, authentication of data processing systems throughout a distributed environment.

To facilitate authentication of data processing systems, the system may include one or more data processing systems 100. Data processing systems 100 may include any number of data processing systems (e.g., 100A-100N). For example, data processing systems 100 may include one data processing system (e.g., 100A) or multiple data processing systems (e.g., 100A-100N) that may independently and/or cooperatively facilitate the authentication of data processing systems. Each data processing system of data processing systems 100 may include one or more data sources (not shown) that may perform measurements and provide data based on the measurements to data processing systems 100.

All, or a portion, of data processing systems 100 may provide (and/or participate in and/or support the) computer-implemented services to various computing devices operably connected to data processing systems 100.

The computer-implemented services may include any type and quantity of services including, for example, authentication of data processing systems in a distributed environment. Different data processing systems may provide similar and/or different computer-implemented services.

When providing the computer-implemented services, the system of FIG. 1 may determine whether devices throughout a distributed environment are authenticated prior to exchanging sensitive information. To do so, the system of FIG. 1 may establish a root of trust with each data processing system throughout the distributed environment.

However, roots of trust may be lost and/or otherwise become invalid over time. Re-establishing roots of trust may be a computationally expensive and time-consuming process, as highly distributed environments may include multiple data processing systems that may each individually require re-establishment of roots of trust at different times and/or via different means. Re-establishing a root of trust may require a user to, for example, answer security questions, may require the data processing systems to store additional authentication data, and/or may require other means of intervention by the user. By doing so, undesirable amounts of computing resources may be consumed by the data processing systems and/or the network core (which may each have a limited amount of computing resources available for operation and storage), and delays may occur in operation of the system.

In general, embodiments disclosed herein may provide methods, systems, and/or devices for maintaining authentication of data processing systems throughout a distributed environment without user intervention. To maintain authentication of data processing systems, the system of FIG. 1 may establish a root of trust to any number of data processing systems throughout the distributed environment. Following establishment of the root of trust, the data processing systems may provide the network core with telemetry data. Therefore, both the network core and the data processing systems may maintain substantially identical activity logs storing the telemetry data.

However, the data processing system, the network core, and/or other devices throughout the distributed environment may have a limited quantity of computing resources available to perform actions such as, for example, storing the telemetry data. Therefore, telemetry data may be analyzed to determine whether to store the telemetry data in the activity log.

To determine whether to store the telemetry data in the activity log, each data point of the telemetry data may be assigned a security score. Each security score may indicate a contribution of a data point to the security profile of the activity log. The security scores may be compared to a security score threshold. Any data point with a security score exceeding the security score threshold may be stored (up to a storage capacity) in the activity log.

In the event of a dissolution of the root of trust, the network core may utilize the telemetry data in the activity log to generate a security questionnaire. The security questionnaire may include security questions related to past communications, errors, updates, collected data, etc. of the data processing system.

The security questionnaire may be provided to the data processing system and the data processing system may generate a response including answers to the questions in the security questionnaire using the previously stored telemetry data. As the data processing system may already store the telemetry data for other purposes (e.g., data backup, system updates, etc.) accessing the telemetry data to answer questions in the questionnaire may not require additional data to be processed or stored by the data processing system during re-authentication.

The data processing system may provide a response to the network core and the network core may determine whether answers provided in the response match previously determined accepted answers to the questions. If the answers match the previously determined accepted answers (e.g., to a degree considered acceptable), the data processing system may be considered authentic. By doing so, data processing systems may be more efficiently re-authenticated following dissolution of roots of trust throughout a distributed environment. As a distributed environment may include many data processing systems and roots of trust may be lost for various reasons over time, this method of re-establishing roots of trust between the data processing systems and the network core without user intervention may provide a timely and computationally efficient solution.

To provide the above noted functionality, the system of FIG. 1 may include network core 102. Network core 102 may (i) establish a secure connection to a data processing system, (ii) obtain telemetry data from the data processing system, (iii) identify a listing of candidate data points from the telemetry data, and/or (iv) attempt to improve a security profile of an activity log using the listing of the candidate datapoints to obtain an updated activity log.

The listing of the candidate data points may be identified by obtaining a security score for each data point of the telemetry data. The security score may indicate a potential security impact of adding the data point to the activity log on the security profile of the activity log. Security scores may be obtained, for example, by performing a security score optimization process. The security score optimization process may include scanning potential security questions based on each data point of the telemetry data and identifying a potential security score corresponding to each potential security question. The security score may be assigned to the data point based on the potential security score (or scores) that indicate the highest degree of security. Security scores may also be obtained using an inference model trained to generate security scores based on a security risk level of a source of a data point and characteristics of the data point. The security scores may be compared to a security score threshold and any data point with a security score that exceeds the security score threshold may be added to the listing of the candidate data points.

Attempting to improve the security profile of the activity log may include: (i) adding the candidate data points of the listing of the candidate data points to the activity log, (ii) replacing a data point stored in the activity log with a candidate data point of the listing of the candidate data points, and/or (iii) updating a membership of the data points stored in the activity log.

The data point stored in the activity log may be replaced by the candidate data point if: (i) there is insufficient storage capacity available to add the candidate data point to the activity log, and/or (ii) adding the candidate data point improves a security profile of the activity log.

To update the membership of data points stored in the activity log, network core 102 may monitor changes to the security score threshold and/or the security scores of the data points stored in the activity log. If a security score associated with a data point stored in the activity log no longer exceeds the security score threshold, the data points may be removed from the activity log.

Following loss of a root of trust between network core 102 and the data processing system, network core 102 may (i) identify an occurrence of an event indicating that a data processing system is to be authenticated, (ii) obtain a security questionnaire, (iii) provide the security questionnaire to the data processing system, (iv) obtain a response from the data processing system, (v) determine whether answers in the response match pre-determined answers, and/or (vi) if the answers in the response match the pre-determined answers, conclude that the data processing system is authentic.

The occurrence of the event may include a dissolution of a previously established root of trust. A root of trust may be lost due to, for example, a password change, exposure or change of a cryptographic key, a duration of time passing, etc. Following the event, the data processing system may no longer be trusted, and a secure communication channel may no longer be available.

To obtain the security questionnaire, the network core may: (i) obtain telemetry data from an activity log, (ii) obtain at least one security question based on the telemetry data, and/or (iv) obtain the security questionnaire using, at least in part, the at least one security question.

The security questionnaire may include any number of security questions based on the activity log hosted by the network core. The security questions may include, for example, questions regarding content of messages, update schedules, lifecycle data of the data processing system, and/or other data.

When performing its functionality, network core 102 and/or data processing systems 100 may perform all, or a portion, of the methods and/or actions shown in FIGS. 2A-4C.

Data processing systems 100 and/or network core 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data processing systems 100 and/or network core 102 are implemented using an internet of things (IoT) device, which may include a computing device. The IoT device may operate in accordance with a communication model and/or management model known to network core 102, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

Figure 2A:
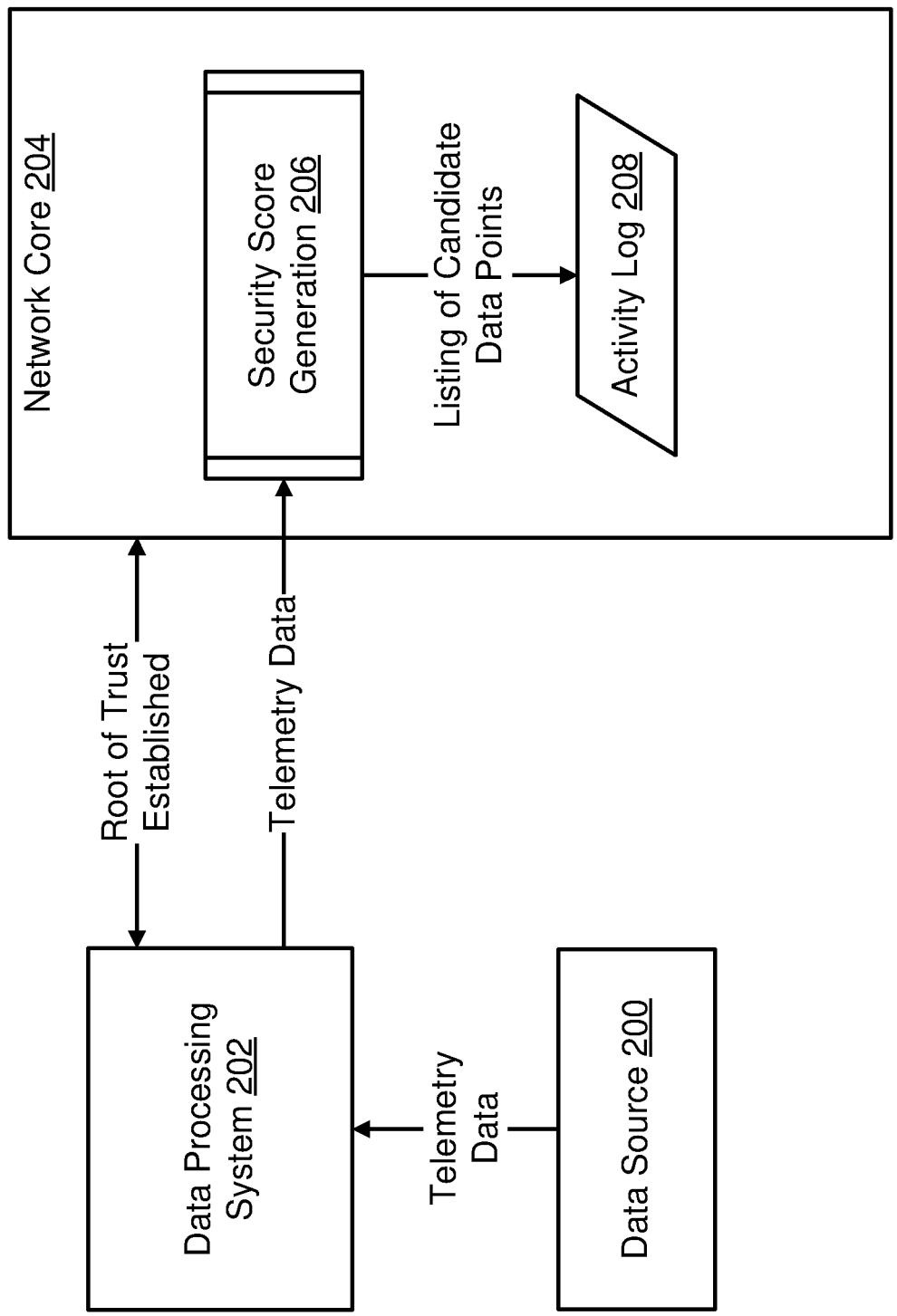
FIG. 2A shows a block diagram illustrating a data processing system interacting with a data source and a network core over time in accordance with an embodiment.
Figure 2B:
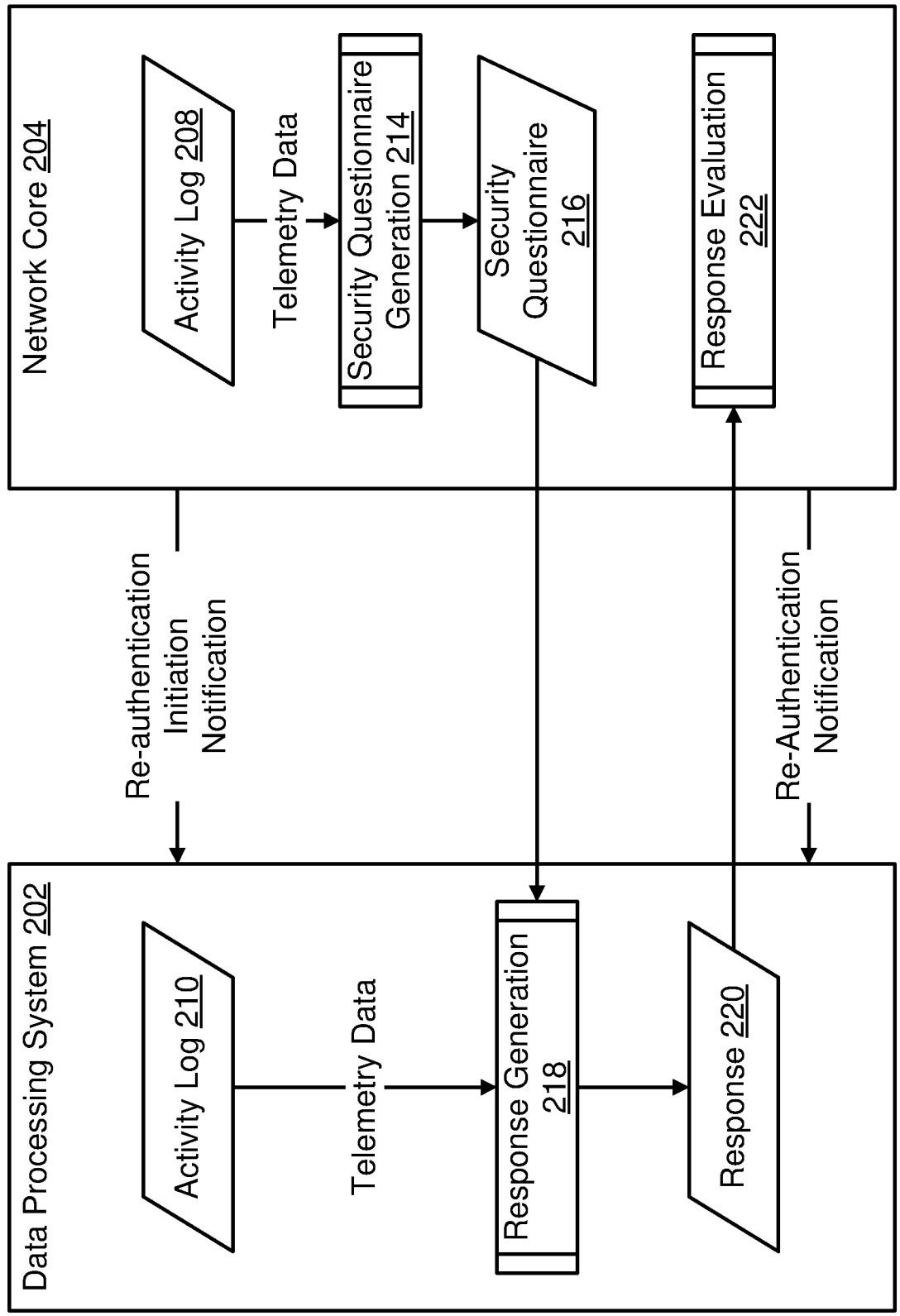
FIG. 2B shows a block diagram illustrating a network core and a data processing system over time in accordance with an embodiment.

To further clarify embodiments disclosed herein, diagrams illustrating data flows and/or processes performed in a system in accordance with an embodiment are shown in FIGS. 2A-2B.

FIG. 2A shows a diagram of data processing system 202 interacting with data source 200 and network core 204. Data processing system 202 may be similar to any of data processing systems 100 and network core 204 may be similar to network core 102. In FIG. 2A, data processing system 202 may be connected to data source 200 via a communication system (not shown). Communications between data processing system 202, network core 204, and data source 200 are illustrated using lines terminating in arrows.

As discussed with reference to FIG. 1, data source 200 may transmit telemetry data to data processing system 202. Data source 200 may include one data source and/or multiple data sources. Data source 200 may be, for example, a sensor positioned in an ambient environment to perform measurements related to the ambient environment. Telemetry data may be based on historic activities of the data processing system and may include any data related to the operation of data source 200 that may be useful to monitor and/or assess the performance, security, etc. of data source 200. For example, telemetry data may include: (i) lifecycle data reflecting operation of data source 200, (ii) content of messages transmitted from data source 200 to data processing system 202 and/or network core 204, (iii) statistics associated with operation of data source 200, (iv) error event data reflecting a subset of the operation of data source 200, the subset including undesired operation of data source 200, and/or other data.

As discussed above, network core 204 may perform computer-implemented services by authenticating devices throughout a distributed environment.

To authenticate devices, network core 204 may establish a root of trust with data processing system 200. The root of trust may indicate that data processing system 200 is authenticated and may exchange secure communications with network core 204. The root of trust may be established via any means including, for example, a user entering a password, pin, biometric factor, etc.

Data processing system 202 may transmit the telemetry data to network core 204 and network core 204 may perform security score generation 206 process using the telemetry data. Security score generation 206 process may include generating security scores for each data point of the telemetry data. The security scores may indicate a potential security impact of adding data points to activity log 208 on the security profile of activity log 208.

Security score generation 206 process may include performing a security score optimization process using the telemetry data and activity log 208 to determine the potential security impact of adding each data point of the telemetry data to activity log 208 on the security profile of activity log 208. To do so, a listing of potential security questions may be obtained based on each data point of the telemetry data. Each potential security question of the listing of the potential security questions may be assigned a corresponding potential security score based on characteristics of a data source associated with the data point, characteristics of the data point, a potential security impact of adding the data point to activity log 208, and/or other factors. A security score may be assigned to each data point based on one or more of the potential security scores that indicate a highest degree of security.

Security score generation 206 process may also be performed, for example, using an inference model trained to generate security scores based on: (i) a global security score associated with a security risk level of a source of the data point (e.g., data source 200), and (ii) a data security score associated with characteristics of the data point. The security risk level of data source 200 may be based on a level of difficulty of duplicating a measurement (e.g., a degree of unpredictability) of a quantity measured by data source 200. The characteristics of the data point may include a level of anomalousness associated with the data point, a degree of variability of a feature associated with the data point, and/or other characteristics.

Security score generation 206 process may include generation of a listing of candidate data points. The listing of the candidate data points may include data points of the telemetry data with security scores that exceed a security score threshold. Candidate data points of the listing of the candidate data points may be stored in activity log 208 if sufficient storage capacity is available. Therefore, activity log 208 may store shared knowledge known to data processing system 202 and network core 204 (e.g., telemetry data and/or other data related to data processing system 202).

Figure 3A:
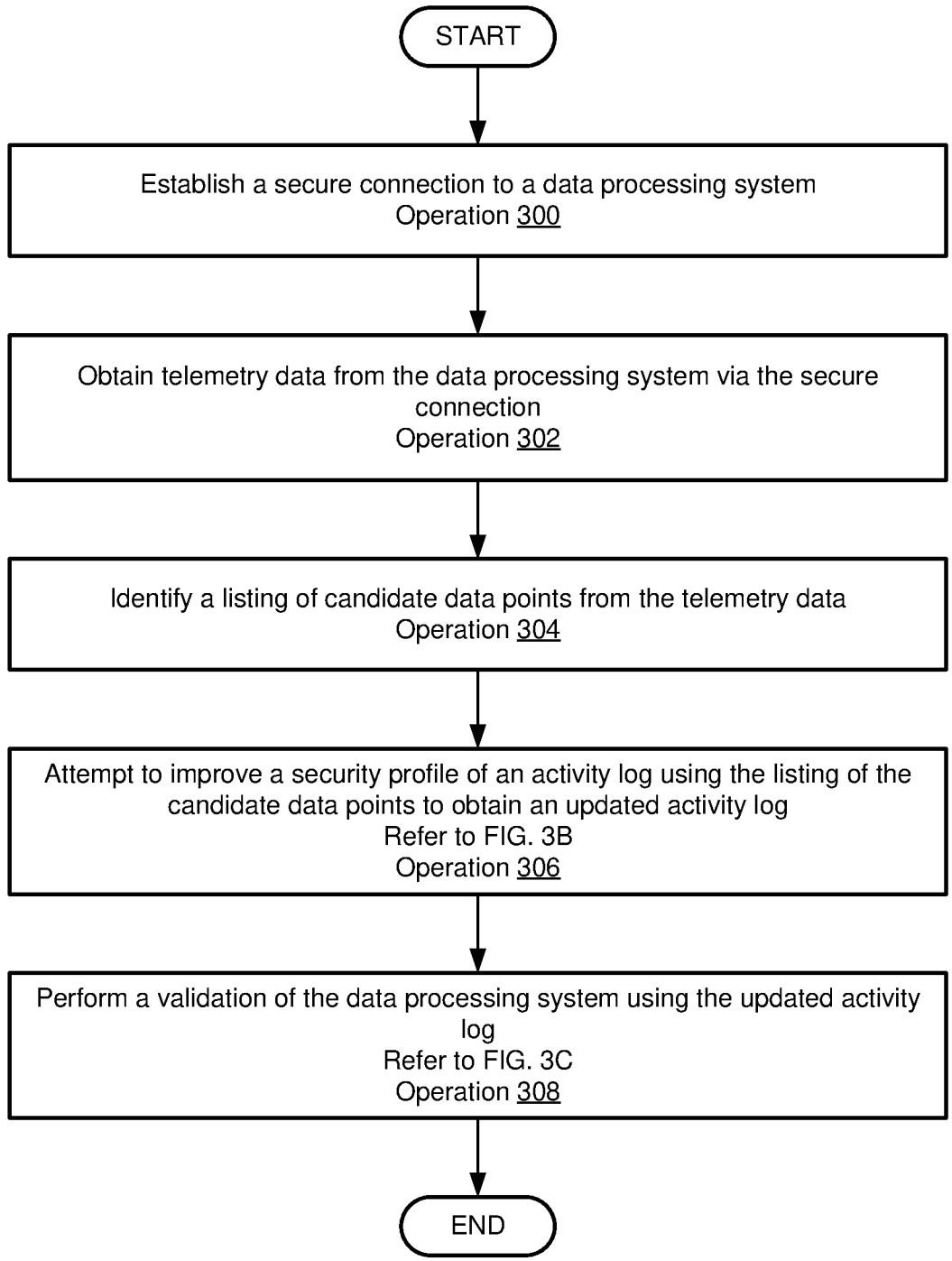
FIG. 3A shows a flow diagram illustrating a method of a method of device authentication without user intervention in accordance with an embodiment.
Figure 3B:
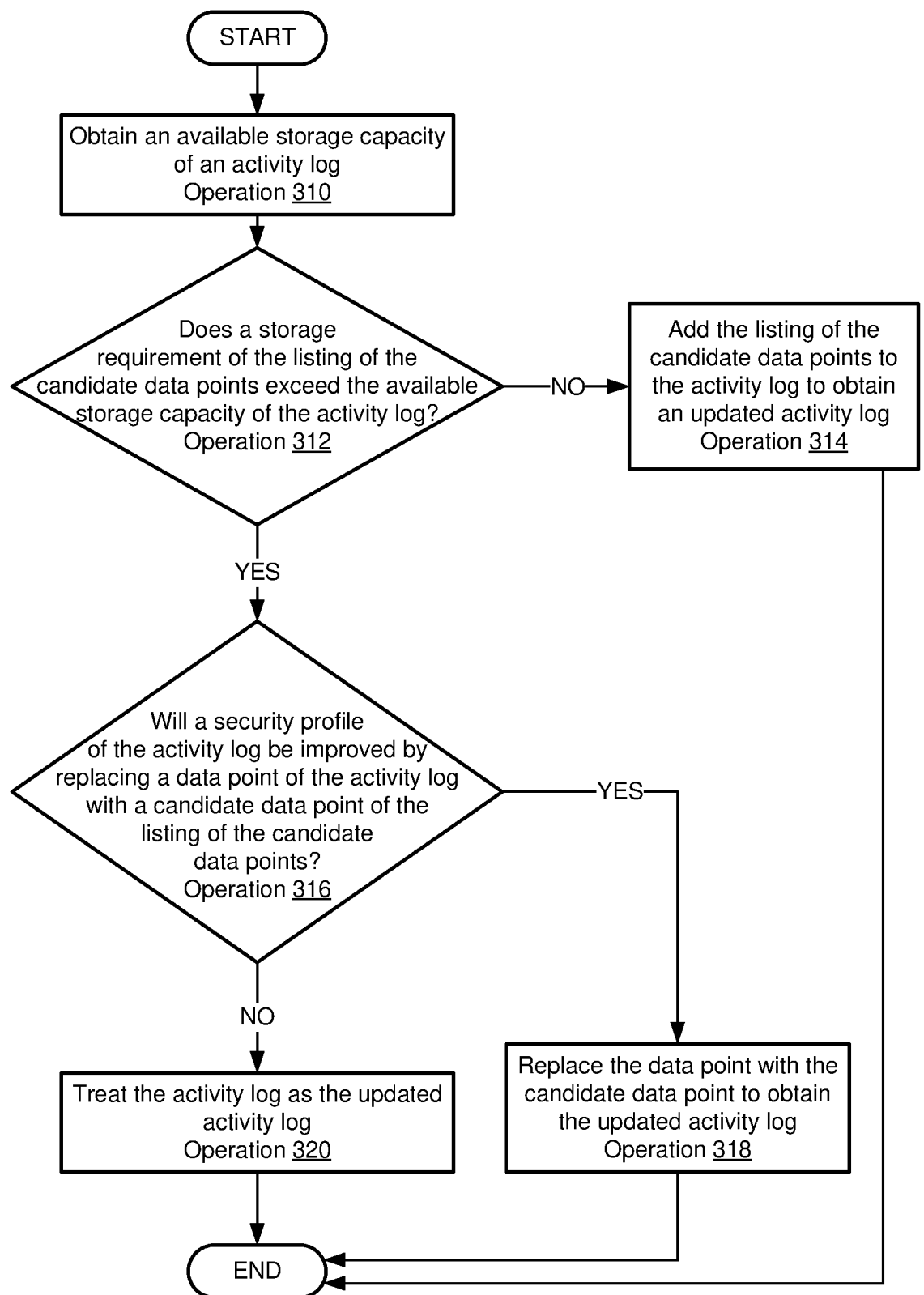
FIG. 3B shows a flow diagram illustrating a method of attempting to improve a security profile of an activity log in accordance with an embodiment.

If sufficient storage capacity is not available in activity log 208, the security scores of the candidate data points and the security scores of the data points stored in activity log 208 may be compared. A data point stored in activity log 208 may be replaced with a candidate data point if the replacement improves the security profile of activity log 208. Refer to FIG. 3B for additional details regarding improving security profiles.

Turning to FIG. 2B, a diagram of network core 204 interacting with data processing system 202 is shown. Network core 204 may be similar to network core 102 shown in FIG. 1. In FIG. 2B, network core 204 may be connected to data processing system 202 via a communication system (not shown). Data processing system 202 may be similar to any of data processing systems 100. Communications between network core 204 and data processing system 202 are illustrated using lines terminating in arrows.

The root of trust established in FIG. 2A may become invalid due to, for example, password changes, cryptographic key exposure, security certificate changes, and/or for other reasons. If the root of trust is lost, network core 204 may transmit a re-authentication initiation notification to data processing system 202. Data processing system 202 may transmit a response (not shown) to establish that data processing system 202 is ready to participate in a re-authentication process.

To re-authenticate data processing system 202 without user intervention, network core 204 may perform security questionnaire generation 214 process. Security questionnaire generation 214 process may include generating security questionnaire 216 using telemetry data from activity log 208. As described in FIG. 2A, activity log 208 may include telemetry data known to data processing system 202 and network core 204, the telemetry data being obtained prior to a loss of a root of trust between data processing system 202 and network core 204. Activity log 208 and activity log 210 may be exclusively used for re-establishing a root of trust between data processing system 202 and network core 204 after the root of trust is lost.

To perform security questionnaire generation 214 process, network core 204 may obtain telemetry data from activity log 208 and may populate security questionnaire 216 with a series of security questions based on data points chosen from the telemetry data. Network core 204 may also generate a set of acceptable answers to the security questions.

Network core 204 may transmit security questionnaire 216 to data processing system 202. Data processing system 202 may perform response generation 218 process using the security questionnaire to generate response 220. Response generation 218 process may include retrieving a portion of the telemetry data from activity log 210 to compile answers the security questions. Response 220 may include answers that are responsive to security questions of security questionnaire 216.

Data processing system 202 may transmit response 220 to network core 204 and network core 204 may perform response evaluation 222 process using the response 220 and the previously established set of acceptable answers (not shown). If the answers in response 220 match the answers in the set of acceptable answers (to a degree considered acceptable by network core 204), data processing system 202 may be concluded to be authentic. If the answers in response 220 do not match the answers in the set of acceptable answers, data processing system 202 may not be concluded to be authentic.

In response to concluding that data processing system 202 is authentic, network core 204 may transmit a re-authentication notification to notify data processing system 202 of successful re-authentication and, therefore, a re-establishment of the root of trust. By re-authenticating data processing system 202 using telemetry data already stored by data processing system 202 and without user intervention, authentication of devices throughout a distributed environment may be timely and computationally efficiently maintained.

In an embodiment, network core 204 is implemented using a processor adapted to execute computing code stored on a persistent storage that when executed by the processor performs the functionality of network core 204 discussed throughout this application. The processor may be a hardware processor including circuitry such as, for example, a central processing unit, a processing core, or a microcontroller. The processor may be other types of hardware devices for processing information without departing from embodiments disclosed herein.

Figure 3C:
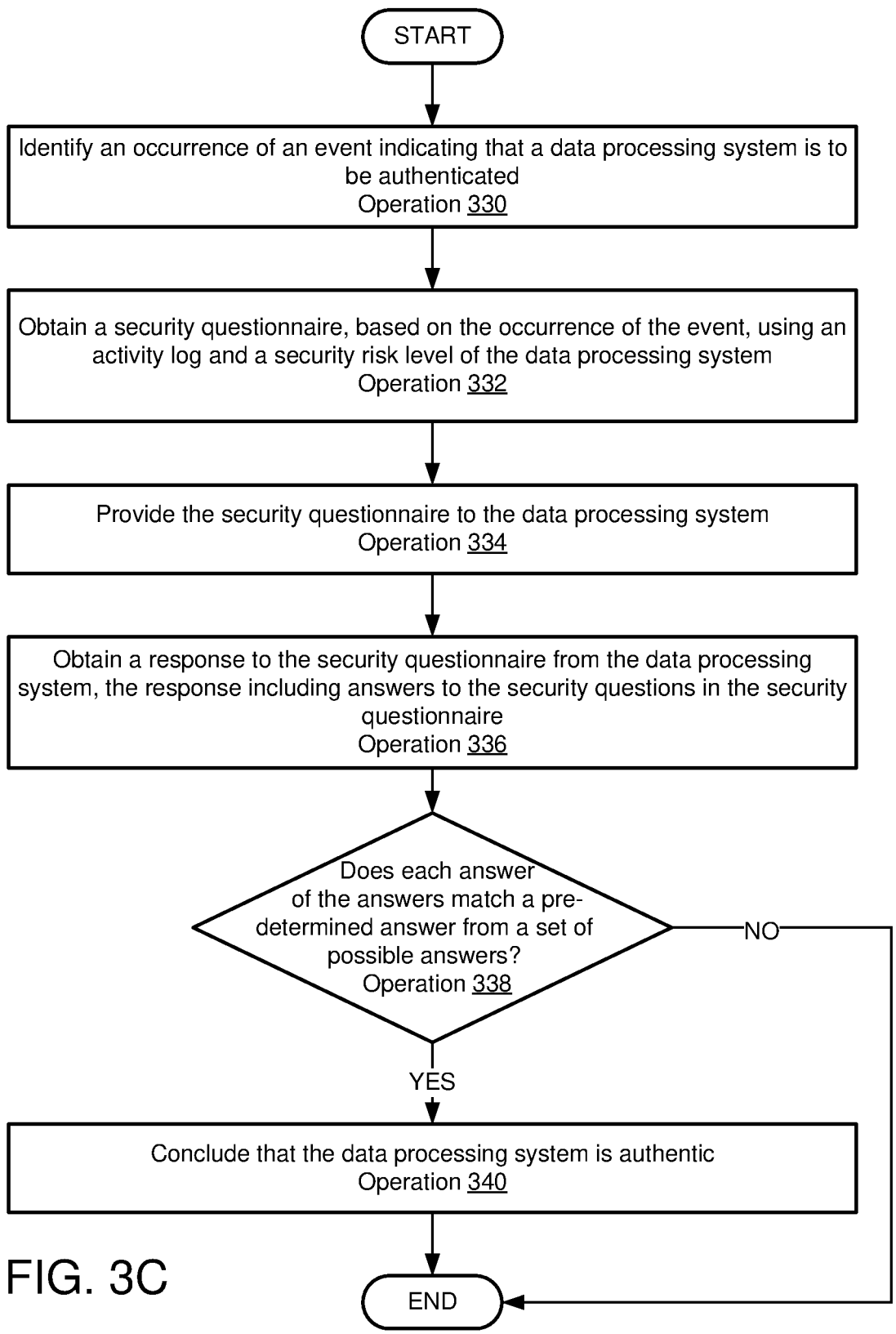
FIG. 3C shows a flow diagram illustrating a method of performing a validation of a data processing system in accordance with an embodiment.

As discussed above, the components of FIG. 1 may perform various methods to perform device authentication in a distributed environment without user intervention. FIGS. 3A-3C illustrate methods that may be performed by the components of FIG. 1. In the diagrams discussed below and shown in FIGS. 3A-3C, any of the operations may be repeated, performed in different orders, and/or performed in parallel with or in a partially overlapping in time manner with other operations.

Turning to FIG. 3A, a flow diagram a method of a method of device authentication without user intervention is shown. The method may be performed, for example, by a network core, data processing system, and/or any other device.

At operation 300, a secure connection is established to a data processing system. The secure connection may be established by: (i) establishing a root of trust between the network core and the data processing system via user intervention, and (ii) while the root of trust is in place, using the root of trust to establish a secure communication channel between the network core and the data processing system.

The root of trust may be established via a user providing an authentication factor (e.g., a password, a pin, a fingerprint, etc.). The user may provide the authentication factor by interacting with a graphical user interface (GUI) on a device (e.g., the data processing system and/or another device throughout the distributed environment). The root of trust may also be established via the user traveling to a particular location with a physical item (e.g., a token, card, etc.). Combinations of authentication factors may also be used (e.g., a card and a password) to establish the root of trust. To establish the secure communication channel, the network core may transmit a shared secret (e.g., a secure cryptographic key) to the data processing system via a communication system.

At operation 302, telemetry data is obtained from the data processing system via the secure connection. Telemetry data may be obtained in the form of a message via the secure connection. The telemetry data may be obtained continuously, at regular intervals, and/or when requested by the network core. Telemetry data may also be transmitted to another trusted device and the telemetry data may be obtained from the trusted device.

At operation 304, a listing of candidate data points is identified from the telemetry data. To identify the listing of the candidate data points, the following steps may be performed for each data point of the telemetry data: (i) obtaining a security score associated with the data point, (ii) determining whether the security score exceeds the security score threshold, and/or (iii) if the security score exceeds the security score threshold, adding the data point to the listing of the candidate data points.

Obtaining the security score associated with the data point may include performing a security score optimization process. Performing the security score optimization process may include: (i) obtaining one or more potential security questions based on the data point; (ii) obtaining a listing of potential security scores, each potential security score of the listing of the potential security scores corresponding to a potential security question of the one or more potential security questions; (iii) identifying one or more potential security scores that indicate a highest degree of security based on the listing of the potential security scores, and/or (iv) assigning the security score based on the one or more potential security scores that indicate a highest degree of security.

To obtain the one or more potential security questions, the data point, characteristics of the data point, and/or historical security questions may be fed into an inference model or rules-based engine trained to generate potential security questions. For example, an anomalous temperature measurement, a timestamp associated with the anomalous temperature measurement, statistics associated with the anomalous temperature measurement (e.g., a duration of time since the last similar measurement, etc.), and/or historical questions based on other anomalous temperature measurements may be used as ingest for the inference model and/or may be used via other methods to generate the one of more potential security questions.

The one or more potential security questions may also be obtained by transmitting the data point, characteristics of the data point, historical security questions, and/or other data to another entity responsible for generating potential security questions.

To obtain the listing of the potential security scores, each potential security question of the one or more potential security questions may be assigned a potential security score based on characteristics of each potential security question, a database of historical security questions and corresponding security scores, and/or other data. Potential security scores may also be assigned based on the potential security impact of adding each potential security question to the activity log.

The listing of the potential security scores may also be obtained by transmitting the one or more potential security questions to another entity responsible for assigning potential security scores and receiving the listing of the potential security scores from the entity in response.

The one or more potential security scores that indicate the highest degree of security may be identified by selecting one or more security scores based on a schema for indicating degrees of security in security scores. For example, security scores with higher numerical scores may indicate higher degrees of security. The one or more potential security scores that indicate the highest degree of security may be identified using other criteria and/or by transmitting the listing of the potential security scores to another entity responsible for identifying the one or more potential security scores that indicate the highest degree of security.

The security score may be assigned by treating the potential security score that indicates the highest degree of security as the security score. The security score may also be assigned by averaging a listing of several potential security scores that collectively indicate the highest degree of security. The security score may also be assigned by transmitting the one or more potential security scores that indicate the highest degree of security (and/or other data) to another entity responsible for assigning the security score.

Obtaining the security score associated with the data point may also include: (i) obtaining an inference model trained to generate the security score, and/or (ii) obtaining an inference using the trained inference model. The security score associated with the data point may also be obtained by reading the security score from storage, by requesting the security score from another entity responsible for generating and/or storing security scores, and/or via other methods without departing from embodiments disclosed herein.

The trained inference model may be obtained by (i) reading the inference model from storage, (ii) receiving the inference model from another device, and/or (iii) generating the inference model, for example by programming a data processing system and/or another device and training the inference model using training data. The inference model may be a particular type of inference model, such as a linear regression model, a deep neural network, a decision tree, etc.

The inference may be obtained by feeding ingest data (e.g., the telemetry data) to the trained inference model. The trained inference model may produce the inference (e.g., the security score) as output in response to the ingest data. The inference may also be obtained by transmitting the ingest data to another entity responsible for hosting and operating the inference model and requesting the inference from the entity.

Determining whether the security score exceeds the security score threshold may include: (i) obtaining the security score threshold, and/or (ii) comparing the security score to the security score threshold.

To obtain the security score threshold, a security risk level of the data processing system may be obtained. The security risk level of the data processing system may be calculated based on telemetry data in the activity log, specifications (e.g., connectivity to the network core, computing resource availability, device privileges, etc.) related to the data processing system, and/or other statistics. The security risk level of the data processing system may also be obtained from another device responsible for generating and/or storing security risk levels. The security risk level of the data processing system may indicate a security score threshold usable to select data points of the telemetry data. Therefore, the security score threshold may be obtained as part of the security risk level and may be extracted from the security risk level to obtain the security score threshold.

If the security score exceeds the security score threshold, the data point may be added to the listing of candidate data points. The data point may be added to the listing of candidate data points by generating a data structure to act as the listing of candidate data points. The data point may also be added to an existing data structure to update the listing of candidate data points. The data point may also be transmitted (via a secure connection) to another device responsible for storing the data point in the listing of candidate data points.

At operation 306, improving a security profile of an activity log is attempted using the listing of the candidate data points to obtain an updated activity log. Attempting to improve the security profile of the activity log may include: (i) obtaining an available storage capacity of the activity log, and/or (ii) determining whether a storage requirement of the listing of the candidate data points exceeds the available storage capacity of the activity log. If the storage requirement of the listing of the candidate data points does not exceed the available storage capacity of the activity log, the listing of the candidate data points may be added to the activity log. If the storage requirement of the listing of the candidate data points exceeds the available storage capacity of the activity log, it may be determined whether replacing any data points stored in the activity log with candidate data points of the listing of the candidate data points improves a security profile of the activity log. Refer to FIG. 3B for additional details regarding improving the security profile of the activity log.

Following attempting to improve the security profile of the activity log, membership of the data points stored in the updated activity log may be monitored over time and modified if needed (not shown). Monitoring the membership of the data points in the updated activity log may include: (i) obtaining an updated security score for a data point stored in the updated activity log, (ii) determining whether the updated security score exceeds the security score threshold, (iii) if the updated security score exceeds the security score threshold, maintaining the data point in the updated activity log, and/or (iv) if the updated security score does not exceed the security score threshold, removing the data point from the updated activity log and updating the available storage capacity of the updated activity log.

An updated security score may be obtained by re-calculating the security score for the data point stored in the updated activity log. Re-calculating the security score may be performed at regular intervals, continuously, and/or when requested by another entity. Re-calculating the security score may include performing the previously mentioned security score optimization process and/or by feeding the data point into the previously described trained inference model to obtain the updated security score. The updated security score may be obtained from another entity and/or obtained via other methods without departing from embodiments disclosed herein.

To determine whether the updated security score exceeds the security score threshold, the security score threshold may be verified. Verifying the security score threshold may include re-calculating the security score threshold, requesting an updated security score threshold from another entity, and/or reading the security score threshold from storage and comparing the newly obtained security score threshold to the previously obtained security score threshold. The updated security score may then be compared to the security score threshold to determine whether the membership of the data point in the updated activity log should be modified.

Maintaining the data point in the updated activity log may include updating credentials (e.g., a timestamp of the verification, etc.) in a data structure associated with the activity log, transmitting a notification of the verification to another entity, and/or performing no action.

Removing the data point from the updated activity log may include deleting the data point from the data structure, storing the data point elsewhere, labeling the data point for removal by another entity, transmitting a request for removal of the data point to another entity, and/or other actions.

To update the available storage capacity of the updated activity log, an application programmed to determine storage usage by data structures may be used. For example, the application may be a file system used by an operating system to control storage of data in the updated activity log. Updating the available storage capacity of the updated activity log may also include modifying a label associated with the updated activity log to reflect the updated available storage capacity, requesting an update to the available storage capacity from another entity, and/or other actions.

At operation 308, a validation of the data processing system is performed using the updated activity log. Performing the validation of the data processing system may include: (i) identifying an occurrence of an event indicating that the data processing system is to be authenticated, (ii) obtaining a security questionnaire, based on the occurrence of the event, using the activity log, (iii) providing the security questionnaire to the data processing system, (iv) obtaining a response from the data processing system, the response including answers to the security questions in the security questionnaire, (v) determining whether each answer of the answers matches a pre-determined answer from a set of possible answers, and/or (vi) if each answer of the answers matches the pre-determined answer, concluding that the data processing system is authentic. Refer to FIG. 3C for additional details regarding performing the validation of the data processing system.

The method may end following operation 308.

Turning to FIG. 3B, a flow diagram illustrating a method of attempting to improve a security profile of an activity log in accordance with an embodiment is shown. The method may be performed, for example, by a network core, data processing system, and/or any other device. The operations shown in FIG. 3B may be an expansion of operation 306 in FIG. 3A.

At operation 310, an available storage capacity of an activity log is obtained. The available storage capacity of the activity log may be obtained using an application programmed to determine storage usage by data structures. As previously mentioned, the application may be a file system used by an operating system to monitor storage of data in the updated activity log. The available storage capacity of the activity log may also be updated by accessing a database including a listing of available storage capacities of components of the system (e.g., including the activity log), and/or via requesting the available storage capacity from another entity hosting the application and/or database. The available storage capacity of the activity log may change over time due to, for example, a dynamic storage system that optimizes computing resource usage by allocating different amounts of storage capacity as needed. Therefore, the available storage capacity of the activity log may be obtained at regular intervals to determine whether the available storage capacity of the activity log has changed.

At operation 312, it is determined whether a storage requirement of the listing of the candidate data points exceeds the available storage capacity of the activity log. To determine whether the storage requirement of the listing of the candidate data points exceeds the available storage capacity of the activity log, the storage requirement of the listing of the candidate data points may be obtained and compared to the available storage capacity of the activity log.

To obtain the storage requirement of the listing of the candidate data points, a file size of the listing of the candidate data points may be read from storage, may be obtained via an application (e.g., a file system) programmed to manage data structures, and/or may be obtained via other methods. The storage requirement of the listing of the candidate data points may also be obtained by transmitting the listing of the candidate data points to another entity and receiving the storage requirement as a response. If the storage requirement of the listing of the candidate data points does not exceed the available storage capacity of the activity log, the method may proceed to operation 314. If the storage requirement of the listing of the candidate data points exceeds the available storage capacity of the activity log, the method may proceed to operation 316.

At operation 314, the listing of the candidate data points is added to the activity log to obtain an updated activity log. To add the listing of the candidate data points to the activity log, candidate data points associated with the listing of the candidate data points may be extracted from the listing of the candidate data points and entered into a data structure associated with the activity log. The candidate data points may also be added to the activity log by transmitting the listing of the candidate data points to another entity responsible for updating the activity log. The activity log including the candidate data points may be treated as the updated activity log.

The method may end following operation 314.

Returning to operation 312, the method may proceed to operation 316 if the storage requirement of the listing of the candidate data points exceeds the available storage capacity of the activity log.

At operation 316, it is determined whether a security profile of the activity log may be improved by replacing a data point of the activity log with a candidate data point of the listing of the candidate data points. If the security profile of the activity log may be improved by replacing a data point of the activity log with a candidate data point of the listing of the candidate data points, the method may proceed to operation 318. If the security profile of the activity log may not be improved by replacing a data point of the activity log with a candidate data point of the listing of the candidate data points, the method may proceed to operation 320.

Determining whether the security profile of the activity log will be improved may include: (i) obtaining a first security score associated with the candidate data point, (ii) obtaining a second security score associated with the data point, (iii) generating an updated security profile of the activity log using the candidate data point, and/or (iv) comparing the updated security profile to the security profile.

The first security score may be obtained by generating the first security score as described in FIG. 3A, reading the first security score from a listing of security scores associated with the listing of the candidate data points, and/or by requesting the first security score from another entity responsible for storing security scores.

The second security score may be obtained by generating the second security score using methods similar to those described in FIG. 3A with respect to the incoming telemetry data, by reading the second security score from a listing of security scores associated with the activity log and/or by requesting the second security score from another entity responsible for storing security scores.

The updated security profile may be generated using the first security score, the second security score, and a schema for calculating security profiles. The schema for calculating security profiles may include: (i) adding the data security scores of each data point in the activity log, and (ii) adding each global security score only once to the sum of the data security scores. For example, if multiple data points stored in the activity log have a global security score of 2, the global security score of 2 would only be added once to the security profile.

The updated security profile may be obtained by replacing the second security score (e.g., and, therefore, the data security score and the global security score associated with the data point) with the first security score in the calculation of the security profile to obtain an updated security profile.

Comparing the updated security profile to the security profile may include determining whether the updated security profile indicates a higher degree of security than the security profile. This may include, for example, comparing two numbers and determining that the higher number indicates a higher degree of security. Refer to FIGS. 4A-4C for an example of calculating security profiles.

At operation 318, the data point is replaced with the candidate data point to obtain the updated activity log. The data point of the activity log may be replaced with the data point of the listing of the candidate data points by removing the data point and adding the candidate data point to a data structure associated with the activity log to obtain the updated activity log. The data point may also be replaced by transmitting instructions for replacing the data point of the activity log to another entity.

The method may end following operation 318.

Returning to operation 316, the method may proceed to operation 320 if the security profile of the activity log may not be improved by replacing the data point of the activity log with the candidate data point of the listing of the candidate data points.

At operation 320, the activity log is treated as the updated activity log. Treating the activity log as the updated activity log may include discarding the candidate data point (and/or the entire listing of the candidate data points), updating a label associated with the activity log (e.g., a timestamp of the update), transmitting a notification to another entity to treat the activity log as the updated activity log, performing no action, and/or other actions.

The method may end following operation 320.

Turning to FIG. 3C, a flow diagram illustrating a method of performing a validation of a data processing system in accordance with an embodiment is shown. The method may be performed, for example, by a network core, data processing system, and/or any other device. The operations shown in FIG. 3C may be an expansion of operation 308 in FIG. 3A.

At operation 330, an occurrence of an event indicating that a data processing system is to be authenticated is identified. The occurrence of the event may place the previously established secure communication channel into a potentially compromised state. The occurrence of the event may be identified by: (i) receiving a notification that the secure connection has been lost, and/or (ii) terminating the secure connection. The secure connection may be terminated in response to an identification of: (i) a password change, (ii) exposure of the cryptographic key, (iii) a security certificate time-out, and/or other reasons.

At operation 332, a security questionnaire is obtained, based on the occurrence of the event, using an activity log and a security risk level of the data processing system. Obtaining the security questionnaire may include: (i) obtaining telemetry data from an activity log, (ii) obtaining at least one security question based on the telemetry data, and/or (iv) obtaining the security questionnaire using, at least in part, the at least one security question.

The telemetry data may be obtained by accessing the activity log using access credentials, requesting telemetry data from an entity hosting the activity log, and/or via other methods.

Obtaining the at least one security question may include: (i) obtaining a first data point stored in the activity log, (ii) obtaining a first security question based on the first data point, (iii) obtaining a second data point stored in the activity log, and/or (iv) obtaining a second security question based on the second data point. The first data point and the second data point may be chosen based on the security risk level associated with the data processing system to be re-authenticated.

The first data point may be obtained by accessing the activity log using access credentials, via requesting access to the activity log from another entity responsible for hosting the activity log, and/or via other methods. After accessing the activity log, the first data point may be obtained by randomly selecting a data point from the activity log, by selecting a data point listed first in the activity log, and/or using other selection criteria. The first data point may also be obtained by requesting the first data point from another entity responsible for selecting the first data point.

The first security question may be obtained by feeding the first data point into an inference model or rules-based engine trained to form security questions based on data points. The first security question may also be obtained by transmitting the first data point to another entity responsible for generating security questions and receiving the first security question as a response from the entity.

The security questionnaire may be obtained by populating the security questionnaire with the at least one security question. The security questionnaire may be populated with the at least one security question by generating a data structure to be treated as the security questionnaire and adding the at least one security question to the data structure. The at least one security question may also be added to an existing security questionnaire and previous security questions may be adapted, deleted, or analyzed to determine continued relevance.

The security questionnaire may be populated with the at least one security question by transmitting the at least one security question to another device responsible for generating the security questionnaire based on security questions.

Obtaining the security questionnaire may also include obtaining a pre-determined answer for each security question of the security questionnaire. The pre-determined answer for security question of the security questionnaire may be obtained by feeding the security questionnaire and at least a portion of the telemetry data into an inference model trained to generate possible acceptable answers to each security question of the security questionnaire. The possible acceptable answers may be added to a (previously generated or newly generated) data structure to be treated as the answers.

At operation 334, the security questionnaire is provided to the data processing system. The security questionnaire may be provided to the data processing system by transmitting the security questionnaire to the data processing system over a communication system. The security questionnaire may be transmitted automatically when the security questionnaire is generated, may be transmitted upon receipt of a notification that the data processing system is ready to receive the security questionnaire and/or may be transmitted based on any other schedule. The security questionnaire may be provided to the data processing system by sending a notification to another device storing the security questionnaire to transmit the security questionnaire to the data processing system.

At operation 336, a response to the security questionnaire is obtained from the data processing system, the response including answers to the security questions in the security questionnaire. The response may be obtained via a message transmitted by the data processing system over the communication system. Obtaining the response may include decrypting the response using a previously shared cryptographic key, by generating a hash of the pre-determined answers to compare to a hash included in the response, and/or other security measures.

At operation 338, it is determined whether each answer of the answers matches a pre-determined answer from a set of possible answers. If each answer of the answers matches the pre-determined answer from the set of possible answers, the method may proceed to operation 340. If each answer of the answers does not match the pre-determined answer from the set of possible answers, the method may end following operation 338.

Whether each answer of the answers matches a pre-determined answer from a set of possible answers may be determined by: (i) obtaining a first answer from the response, the first answer corresponding to a first security question of the at least one security questions, (ii) determining whether the first answer matches a corresponding pre-determined answer from the set of possible answers, and (iii) if the first answer matches the corresponding pre-determined answer, treating the first answer as accurate.

Obtaining the first answer from the response may include parsing the response into answers to each security question and selecting one of the answers to one of the security questions as the first answer. The first answer may be selected at random, may be selected by selecting the first question in the security questionnaire, and/or may be selected via another selection methodology. The response may also be transmitted to another device responsible for selecting the first answer.

To determine whether the first answer matches the pre-determined answer from the set of possible answers, the pre-determined answer may be obtained. The pre-determined answer (or answers) corresponding to the security question may be selected from the set of possible answers, and the first answer may be compared to the pre-determined answer or answers. If the first answer matches the pre-determined answers (at least substantially or to an extent determined acceptable), the first answer may be considered accurate.

The above-described process may be repeated for each answer included in the response until all answers included in the response have been determined to be accurate or inaccurate.

At operation 340, the data processing system is concluded to be authentic. The data processing system may be concluded to be authentic without the user intervention. Concluding the data processing system to be authentic may include evaluating the accuracy of answers in the response to determine whether the response is accurate enough to consider the data processing system to be authentic. Evaluating the accuracy of the answers in the response may include comparing the number of correct answers to a previously determined amount of acceptable correct answers. Evaluating the accuracy of the answers may be performed via other means, such as comparing a percent accuracy to an acceptable percentage of accuracy, etc. If the answers in the response are considered acceptably accurate, the data processing system may be concluded to be authentic, and the root of trust may be re-established without user intervention. Re-establishing the root of trust may include establishing a new secure communications channel to the data processing system and distributing a new cryptographic key to the data processing system.

The method may end following operation 340.

Turning to FIG. 4A, consider a scenario in which a root of trust is established between a data processing system and a network core. Following establishment of the root of trust, telemetry data 400 (e.g., obtained from one or more data sources throughout the distributed environment) may be transmitted from the data processing system to the network core. However, activity log 402 hosted by the network core (and/or a substantially identical activity log hosted by the data processing system) may have insufficient storage capacity to add the data points of telemetry data 400. To determine whether to replace one or more data points of activity log 402 with one or more data points of telemetry data 400, the security impact of replacing one or more data points of activity log 402 on security profile 406 of activity log 402 may be evaluated.

Each data point included in activity log 402 may have an associated data security score and a global security score, the global security score being associated with the security risk level of the data source from which the data point was obtained (and/or at the time the data point was obtained), and the data security score being associated with characteristics of the data point (e.g., anomalousness, variability, etc.).

Security profile 406 of activity log 402 may have an overall score of 22 (e.g., from adding the data security scores of each data point and each global security score only once). Specifically, the global security score of 2 may only be added once to the security profile. Security profile threshold 404 indicates that security profile 406 must maintain a score of at least 22 following the addition or replacement of any data point in activity log 402. Therefore, data points of activity log 402 may only be replaced if the security profile 406 increases due to the replacement.

For example, a first data point of telemetry data 400 has a data security score of 2 and a global security score of 5. By replacing a first data point of activity log 402 (e.g., with a data security score of 3 and a global security score of 2) with the first data point of telemetry data 400, security profile 406 may be increased to 26.

Turning to FIG. 4B, updated activity log 408 is shown including the first data point of telemetry data 400 (e.g., the data point with the data security score of 2 and the global security score of 5). Updated security profile 410 indicates an overall score of 26 and, therefore, an improvement on the security profile of activity log 402.

Turning to FIG. 4C, consider a scenario in which a root of trust is lost between the data processing system and the network core. To re-establish the root of trust, the network core may generate a security questionnaire based on updated activity log 408. Security questionnaire 420 may be generated to include three questions. As shown in FIG. 4C, the first question may request a temperature recorded at timestamp 2022-03-20 03:02:08. The second question may request the highest temperature recorded the previous week. The third question may request the average temperature recorded on 2022-05-06. Security questionnaire 420 may be transmitted to the data processing system (not shown).

Accepted answers 422 may be generated by the network core and may include responses to the security questions that are considered accurate. The answers of accepted answers 422 may be generated using security questionnaire 420 and updated activity log 408. The network core may obtain a response (not shown) from the data processing system including answers to the security questions. The network core may compare the answers in the response to the answers in accepted answers 422 to determine whether the data processing system is authentic. In this scenario, the answers of the response may match the answers of accepted answers 422 and the data processing system may be assigned status 424 of authentic. As a result, the root of trust may be re-established with the data processing system and secure communications may resume between the network core and the data processing system.

Figure 5:
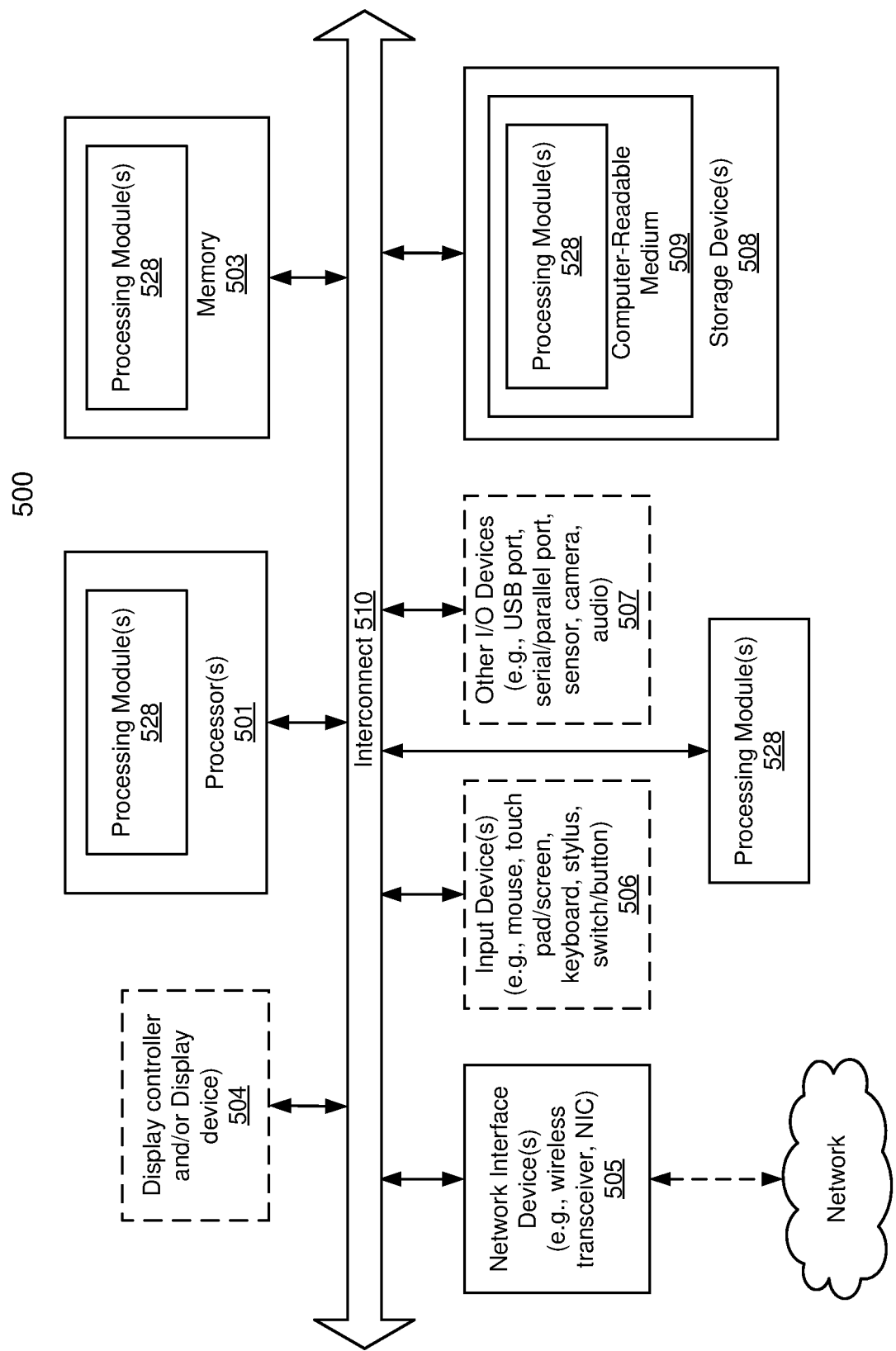
FIG. 5 shows a block diagram illustrating a data processing system in accordance with an embodiment.

Any of the components illustrated in FIGS. 1-4C may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows© operating system from Microsoft©, Mac OS©/iOS© from Apple, Android© from Google©, Linux©, Unix©, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machineaccessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of authenticating a data processing system by a network core throughout a distributed environment, the method comprising:

obtaining telemetry data from the data processing system, the telemetry data being based on historic activities of the data processing system;

identifying a listing of candidate data points from the telemetry data, the listing of the candidate data points comprising data points of the telemetry data with security scores that that exceed a security score threshold;

attempting to improve a security profile of an activity log using the listing of the candidate data points to obtain an updated activity log; and performing a validation of the data processing system using a security questionnaire, the security questionnaire comprising security questions based on the updated activity log.

2. The method of claim 1, wherein identifying the listing of the candidate data points comprises:

for each data point of the telemetry data:

obtaining a security score associated with the data point, the security score indicating a potential security impact of adding the data point to the activity log on the security profile of the activity log;

making a first determination regarding whether the security score exceeds the security score threshold; and in an instance of the first determination in which the security score exceeds the security score threshold: adding the data point to the listing of the candidate data points.

3. The method of claim 2, wherein obtaining the security score associated with the data point comprises:

performing a security score optimization process, wherein performing the security score optimization process comprises:

obtaining one or more potential security questions based on the data point;
obtaining a listing of potential security scores, each potential security score of the listing of the potential security scores corresponding to a potential security question of the one or more potential security questions;
identifying one or more potential security scores that indicate a highest degree of security based on the listing of the potential security scores; and
assigning the security score based on the one or more potential security scores that indicate the highest degree of security.

4. The method of claim 2, wherein obtaining the security score associated with the data point comprises:
obtaining an inference model trained to generate the security score based on:
a global security score associated with a security risk level of a source of the data point; and
a data security score associated with characteristics of the data point; and
obtaining an inference using the trained inference model, the inference comprising the security score.

5. The method of claim 4, wherein the security risk level of the source of the data point is based on a level of difficulty of duplicating a measurement of a quantity measured by the source of the data point.

6. The method of claim 1, wherein attempting to improve the security profile of the activity log comprises:
obtaining an available storage capacity of the activity log;
making a second determination regarding whether a storage requirement of the listing of the candidate data points exceeds the available storage capacity of the activity log; and
in a first instance of the second determination in which the storage requirement does not exceed the available storage capacity:
adding the listing of the candidate data points to the activity log to obtain the updated activity log.

7. The method of claim 6, wherein attempting to improve the security profile of the activity log further comprises:
in a second instance of the second determination in which the storage requirement exceeds the available storage capacity:
making a third determination, using the listing of the candidate data points and the activity log, regarding whether replacing a data point of the activity log with a candidate data point of the listing of the candidate data points improves the security profile;
in a first instance of the third determination in which replacing the data point with the candidate data point improves the security profile:
replacing the data point with the candidate data point to obtain the updated activity log; and
in a second instance of the third determination in which replacing the data point with the candidate data point does not improve the security profile:
treating the activity log as the updated activity log.

8. The method of claim 7, further comprising:
after attempting to improve the security profile of the activity log:
obtaining an updated security score for a data point stored in the updated activity log;
making a first determination regarding whether the updated security score exceeds the security score threshold;
in a first instance of the first determination in which the updated security score exceeds the security score threshold:
maintaining the data point in the updated activity log; and
in a second instance of the first determination in which the updated security score does not exceed the security score threshold:
removing the data point from the updated activity log; and
updating the available storage capacity of the updated activity log.

9. The method of claim 1, wherein performing the validation of the data processing system comprises:
identifying an occurrence of an event indicating that the data processing system is to be authenticated;
obtaining a security questionnaire, based on the occurrence of the event, using the updated activity log;
providing the security questionnaire to the data processing system;
obtaining a response from the data processing system, the response comprising answers to the security questions in the security questionnaire;
making a first determination regarding whether each answer of the answers matches a pre-determined answer from a set of possible answers; and
in an instance of the first determination in which each answer of the answers matches the pre-determined answer:
concluding that the data processing system is authentic.

10. The method of claim 1, wherein the activity log comprises telemetry data known to the data processing system and the network core, the telemetry data being obtained prior to a loss of a root of trust between the data processing system and the network core.

11. The method of claim 10, wherein the validation of the data processing system is performed without user intervention and concluding that the data processing system is authentic re-establishes the root of trust.

12. A non-transitory machine-readable medium having instructions stored therein, which when executed by a processor, cause the processor to perform operations for authenticating a data processing system by a network core throughout a distributed environment, the operations comprising:
obtaining telemetry data from the data processing system, the telemetry data being based on historic activities of the data processing system;
identifying a listing of candidate data points from the telemetry data, the listing of the candidate data points comprising data points of the telemetry data with security scores that that exceed a security score threshold;
attempting to improve a security profile of an activity log using the listing of the candidate data points to obtain an updated activity log; and
performing a validation of the data processing system using a security questionnaire, the security questionnaire comprising security questions based on the updated activity log.

13. The non-transitory machine-readable medium of claim 12, wherein identifying the listing of the candidate data points comprises:
for each data point of the telemetry data:
obtaining a security score associated with the data point, the security score indicating a potential security impact of adding the data point to the activity log on the security profile of the activity log;

making a first determination regarding whether the
security score exceeds the security score threshold;
and in an instance of the first determination in which the
security score exceeds the security score threshold:
adding the data point to the listing of the candidate
data points.

14. The non-transitory machine-readable medium of claim 13, wherein obtaining the security score associated with the data point comprises:
performing a security score optimization process, wherein performing the security score optimization process comprises:
obtaining one or more potential security questions based on the data point;
obtaining a listing of potential security scores, each potential security score of the listing of the potential security scores corresponding to a potential security question of the one or more potential security questions;
identifying one or more potential security scores that indicate a highest degree of security based on the listing of the potential security scores; and
assigning the security score based on the one or more potential security scores that indicate the highest degree of security.

15. The non-transitory machine-readable medium of claim 13, wherein obtaining the security score associated with the data point comprises:
obtaining an inference model trained to generate the security score based on:
a global security score associated with a security risk level of a source of the data point; and
a data security score associated with characteristics of the data point; and
obtaining an inference using the trained inference model, the inference comprising the security score.

16. The non-transitory machine-readable medium of claim 15, wherein the security risk level of the source of the data point is based on a level of difficulty of duplicating a measurement of a quantity measured by the source of the data point.

17. A data processing system, comprising:
a processor; and
a memory coupled to the processor to store instructions, which when executed by the processor, cause the processor to perform operations for authenticating a data processing system by a network core throughout a distributed environment, the operations comprising:
obtaining telemetry data from the data processing system, the telemetry data being based on historic activities of the data processing system;
identifying a listing of candidate data points from the telemetry data, the listing of the candidate data points comprising data points of the telemetry data with security scores that that exceed a security score threshold;
attempting to improve a security profile of an activity log using the listing of the candidate data points to obtain an updated activity log; and
performing a validation of the data processing system using a security questionnaire, the security questionnaire comprising security questions based on the updated activity log.

18. The data processing system of claim 17, wherein identifying the listing of the candidate data points comprises:
for each data point of the telemetry data:
obtaining a security score associated with the data point, the security score indicating a potential security impact of adding the data point to the activity log on the security profile of the activity log;
making a first determination regarding whether the security score exceeds the security score threshold; and
in an instance of the first determination in which the security score exceeds the security score threshold: adding the data point to the listing of the candidate data points.

19. The data processing system of claim 18, wherein obtaining the security score associated with the data point comprises:
performing a security score optimization process, wherein performing the security score optimization process comprises:
obtaining one or more potential security questions based on the data point;
obtaining a listing of potential security scores, each potential security score of the listing of the potential security scores corresponding to a potential security question of the one or more potential security questions;
identifying one or more potential security scores that indicate a highest degree of security based on the listing of the potential security scores; and
assigning the security score based on the one or more potential security scores that indicate the highest degree of security.

20. The data processing system of claim 18, wherein obtaining the security score associated with the data point comprises:
obtaining an inference model trained to generate the security score based on:
a global security score associated with a security risk level of a source of the data point; and
a data security score associated with characteristics of the data point; and
obtaining an inference using the trained inference model, the inference comprising the security score.

* * * * *